United States Patent
Matsuura et al.

(10) Patent No.: US 10,476,392 B1
(45) Date of Patent: Nov. 12, 2019

(54) SWITCHING POWER SUPPLY DEVICE COMPARING FIRST AND SECOND VOLTAGE RANGES

(71) Applicant: TDK CORPORATION, Tokyo (JP)

(72) Inventors: Ken Matsuura, Tokyo (JP); Min Lin, Tokyo (JP)

(73) Assignee: TDK CORPORATION, Tokyo (JP)

( * ) Notice: Subject to any disclaimer, the term of this patent is extended or adjusted under 35 U.S.C. 154(b) by 101 days.

(21) Appl. No.: 15/883,706

(22) Filed: Jan. 30, 2018

(30) Foreign Application Priority Data

Feb. 2, 2017 (JP) .................................. 2017-017336

(51) Int. Cl.
*H02M 3/158* (2006.01)
*H02M 1/00* (2006.01)

(52) U.S. Cl.
CPC .. *H02M 3/1584* (2013.01); *H02M 2001/0035* (2013.01); *H02M 2003/1586* (2013.01)

(58) Field of Classification Search
CPC . H02M 2003/1586; H02M 2001/0035; H02M 3/1584; H02M 2001/0032; H02M 2001/0058
See application file for complete search history.

(56) References Cited

U.S. PATENT DOCUMENTS

| 10,110,132 | B2* | 10/2018 | Matsuura | H02M 3/1584 |
| 2005/0169024 | A1* | 8/2005 | Dwarakanath | H02M 3/157 363/98 |
| 2006/0152205 | A1* | 7/2006 | Tang | H02M 3/1584 323/284 |
| 2016/0087526 | A1* | 3/2016 | Satake | H02M 1/36 323/282 |

FOREIGN PATENT DOCUMENTS

JP      2006-254669      9/2006

OTHER PUBLICATIONS

Pilawa-Podgurski et al., "Very-High-Frequency Resonant Boost Converters", IEEE Transactions on Power Electronics, Jun. 2009, pp. 1654-1665, vol. 24, No. 6.

* cited by examiner

*Primary Examiner* — Harry R Behm
(74) *Attorney, Agent, or Firm* — Greenblum & Bernstein, P.L.C.

(57) ABSTRACT

A switching power supply device generates a DC output voltage, which is to be outputted to a load and is based on a DC input voltage. The switching power supply device includes n converter units and a control unit. The DC output voltage is compared with a voltage range selected out of a first voltage range and a second voltage range set in advance and the control unit executes one of first driving control to fourth driving control depending on the present driving control and the comparison result for the DC output voltage. By switching between the first to fourth driving control, the control unit changes the number of converter units to be driven.

16 Claims, 7 Drawing Sheets

F I G. 8
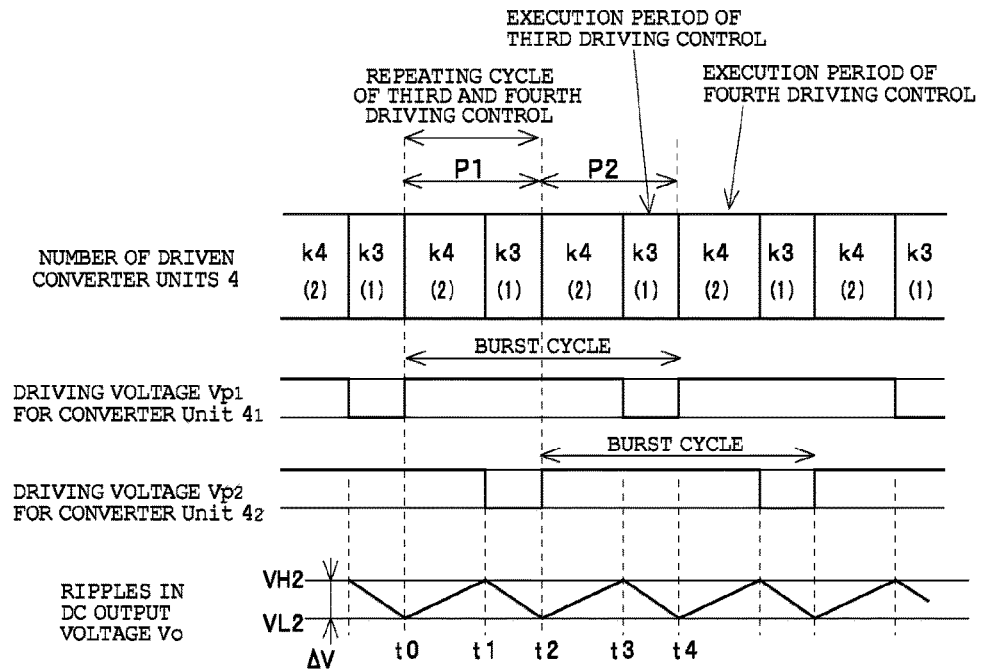
F I G. 9
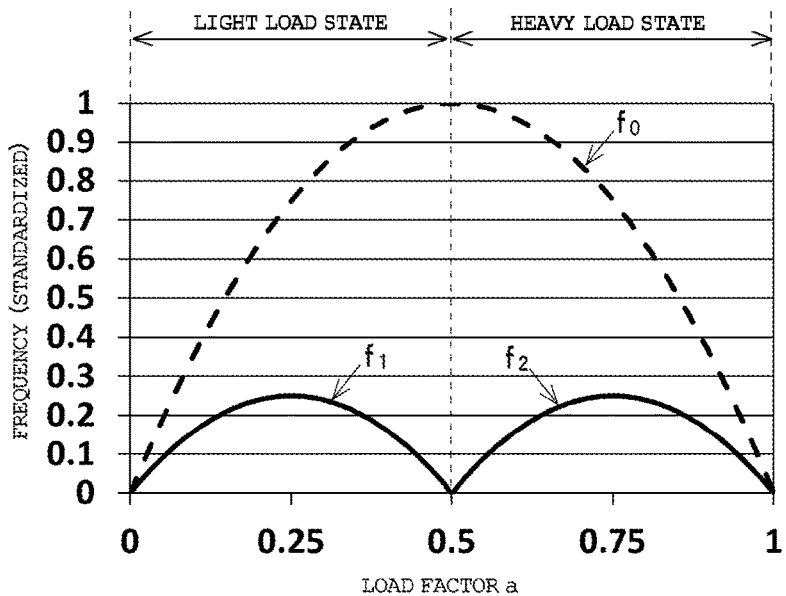

SWITCHING POWER SUPPLY DEVICE COMPARING FIRST AND SECOND VOLTAGE RANGES

FIELD OF THE INVENTION

The present invention relates to a switching power supply device equipped with a plurality of converter units that are interconnected in parallel.

DESCRIPTION OF THE RELATED ART

Due to recent improvements in the performance of power semiconductors and the commercialization of power semiconductors that use compound semiconductors such as GaN and SiC, it has become possible to raise the switching frequency of switching power supply devices, which enables switching power supply devices to be miniaturized and have higher power densities. However, when the power density of a switching power supply device is increased, parasitic inductance present in the wiring and elements becomes problematic. This makes it necessary to use elements, such as surface-mounted elements, that have low parasitic inductance and to mount elements in a compact arrangement to shorten the wiring between them. However, it is typically difficult to increase the output power capacities of individual surface-mounted elements, and even if the output power capacity of one element were increased, it would be difficult to dissipate heat due to the increase in power density.

For this reason, for a high-frequency/high power density switching power supply device, to avoid having elements that dissipate heat crowded together and make the temperature distribution uniform, it is effective to connect a plurality of converters in parallel (see Patent Literature 1 (hereinafter "PTL1") (Japanese Laid-open Patent Publication No. 2006-254669). When the input voltage of a switching power supply device is high, there is a problematic increase in the switching losses of switching elements as the switching frequency increases. To avoid this problem, it is possible to suppress the switching losses by soft switching the switching elements. Soft switching circuits, such as a Class-E converter circuit and a Class Φ2 converter, are known as circuits for soft switching the switching elements in this way (See Non-Patent Literature 1 (hereinafter "NPTL1")("Very-High-Frequency Resonant Boost Converters" IEEE Transactions on Power Electronics, Vol. 24, No. 6, June 2009, pp 1654-1665)).

NPTL1 indicated above discloses the use of burst control to control a Class-E converter circuit. Since controlling a Class-E converter circuit according to burst control makes it possible for a converter circuit to operate with a fixed time ratio and a fixed frequency, it is possible to easily satisfy the conditions for ZVS (zero volt switching) of a converter circuit. As a result, it is possible to convert power with high efficiency across a wide range of loads from a light load to a heavy load.

In more detail, a Class-E converter circuit that uses the burst control method disclosed in NPTL1 is composed of a hysteresis comparator, a high-frequency converter, and a high frequency gate driving circuit. In this Class-E converter circuit, the hysteresis comparator compares the output voltage of the high-frequency converter inputted into the minus input terminal and a reference voltage inputted into the plus input terminal (that is, a voltage that is automatically switched between a low-level reference voltage and a high-level reference voltage based on its own comparator output voltage) and sets the comparator output voltage at the high level when the output voltage inputted into the minus input terminal falls and reaches the reference voltage inputted into the plus input terminal (here, the low-level reference voltage). By doing so, the reference voltage inputted into the plus input terminal is switched from the low-level reference voltage to the high-level reference voltage. At the same time, the high-frequency gate driving circuit is activated and starts to drive the high-frequency converter. By doing so, the output voltage of the high-frequency converter rises and the output voltage inputted into the minus input terminal of the hysteresis comparator also rises.

After this, when the output voltage of the high-frequency converter inputted into the minus input terminal has reached the reference voltage (here, the high-level reference voltage) inputted into the plus input terminal, the hysteresis comparator sets the comparator output voltage at the low level. By doing so, the reference voltage inputted into the plus input terminal is switched from the high-level reference voltage to the low-level reference voltage. At the same time, the driving of the high-frequency converter by the high-frequency gate driving circuit stops. By doing so, the output voltage of the high-frequency converter falls, and the output voltage inputted into the minus input terminal of the hysteresis comparator also falls. In this way, with this Class-E converter circuit, due to the hysteresis comparator, the high-frequency converter, and the high-frequency gate driving circuit repeating the above operation, it is possible to control the output voltage from the high-frequency converter between the low-level reference voltage and the high-level reference voltage.

SUMMARY OF THE INVENTION

With the Class-E converter circuit disclosed in NPTL1, when parallel operation is used to increase the output voltage and improve reliability, during a period where a plurality of Class-E converter circuits connected in parallel operate with a fixed time ratio and a fixed frequency, to have the Class-E converter circuit output a substantially fixed current irrespective of the output voltage, a current balancing circuit such as that disclosed in PTL1 mentioned above is unnecessary.

However, when a plurality of Class-E converter circuits have been simply connected in parallel, since the timing at which the output voltage reaches the reference voltage (the high-level reference voltage or the low-level reference voltage) is the same time for the hysteresis comparators of the Class-E converter circuits, transitions from a driving period to a stopped period in a burst and transitions from a stopped period to a burst driving period are performed simultaneously by the respective Class-E converter circuits. That is, the frequency of ripples in the output voltage produced due to such bursts matches the burst frequency that is the repeating frequency of the driving periods and stopped periods of the Class-E comparator circuits (more specifically, the high-frequency converters of the Class-E comparator circuits).

As one example, for a case where two Class-E comparator circuits of the same configuration are simply connected in parallel and supply power to a common load, as depicted in FIG. 12, since the timing at which the output voltage Vo reaches the reference voltage (a high-level reference voltage VH or a low-level reference voltage VL) at the hysteresis comparator of each Class-E comparator circuit is the same, the driving period and the stopped period in a burst by each Class-E comparator circuit are at the same time. That is, the repeating cycle for the driving period and the stopped period (i.e., the "burst cycle") matches the cycle of ripples in the output voltage Vo (that is, the burst frequency and the frequency of ripples match).

Accordingly, with a switching power supply device of this configuration which performs control over a plurality of Class-E converter circuits connected in parallel so as to simply switch between the driving period and the stopped period in a burst at the same time, to reduce the hysteresis of the hysteresis comparators and make the ripples in the output voltage smaller in order to miniaturize the device and reduce the output capacitance, it is necessary to increase the frequency of the ripples. To do so, it becomes necessary to raise the burst frequency of the Class-E converter circuits. Due to this, in a switching power supply device that uses this configuration (i.e., a configuration where the driving period and stopped period in a burst are simply switched simultaneously for a plurality of Class-E converter circuits that are connected in parallel), there is an increase in the number of times each Class-E converter circuit is driven and stopped per unit time. Since the proportion of the period where there is stable operation with a fixed time ratio and fixed frequency falls, there is the problem of a drop in efficiency.

The present invention was conceived in view of the problem described above and has a principal object of providing a switching power supply device that is capable of improved efficiency while having a plurality of converter units connected in parallel to increase the output power.

To achieve the stated object, a switching power supply device according to the present invention comprises n (where n is an integer of two or higher) converter units that are connected in parallel between a direct current (DC) input unit and a DC output unit; and a control unit that executes driving control over the n converter units, wherein the switching power supply device generates a DC output voltage based on a DC input voltage inputted from the DC input unit and outputs the DC output voltage from the DC output unit to a load, the switching power supply device further comprises a voltage comparator unit that compares the DC output voltage with voltage ranges of a first voltage range set in advance and a second voltage range, which is set in advance, has an upper limit value lower than an upper limit value of the first voltage range and has a lower limit value lower than a lower limit value of the first voltage range, and outputs a comparison result to the control unit, the control unit is configured to be capable of executing first driving control that drives k1 (where k1 is an integer set so that $0 \leq k1 < n$) converter units out of the n converter units, second driving control that drives k2 (where k2 is an integer set so that $k1 < k2 < n$) converter units out of the n converter units, third driving control that drives k3 (where k3 is an integer set so that $k1 < k3 < n$) converter units out of the n converter units, and fourth driving control that drives k4 (where k4 is an integer set so as to exceed k2 and k3 but be equal to or below n) converter units out of the n converter units, the control unit executes the first driving control when, in an execution state of the second driving control, the comparison result has been obtained indicating that the DC output voltage has risen and reached the upper limit value of the first voltage range, the control unit executes the second driving control when, in an execution state of the first driving control, the comparison result has been obtained indicating that the DC output voltage has fallen and reached the lower limit value of the first voltage range, the control unit executes the third driving control when, in an execution state of the fourth driving control, the comparison result has been obtained indicating that the DC output voltage has risen and reached the upper limit value of the second voltage range, the control unit executes the fourth driving control when, in an execution state of the third driving control, the comparison result has been obtained indicating that the DC output voltage has fallen and reached the lower limit value of the second voltage range, the control unit executes the fourth driving control when, in an execution state of the second driving control, the comparison result has been obtained indicating that the DC output voltage has fallen and reached the lower limit value of the second voltage range, and the control unit executes the first driving control when, in an execution state of the third driving control, the comparison result has been obtained indicating that the DC output voltage has risen and reached the upper limit value of the first voltage range.

In this way, in the heavy load state, the control unit repeatedly executes the third driving control and the fourth driving control over the converter units to increase the number of driven converter units and raise the output power, and in the light load state, the control unit repeatedly executes the first driving control and the second driving control over the converter units. By doing so, compared to the heavy load state where the third driving control and the fourth driving control are repeatedly executed, in the light load state, the driven number of converter units can be reduced by repeatedly executing the first driving control and the second driving control, which improves efficiency.

The switching power supply device according to the present invention has, wherein while executing a light load operation that repeatedly executes the second driving control and the first driving control in that order when the load is a light load, the control unit drives, during a new execution of the second driving control and the first driving control, a converter unit that was not driven in an immediately preceding execution of the second driving control and the first driving control, and while executing a heavy load operation that repeatedly executes the fourth driving control and the third driving control in that order when the load is a heavy load that is heavier than the light load, the control unit drives, during a new execution of the fourth driving control and the third driving control, a converter unit that was not driven in an immediately preceding execution of the fourth driving control and the third driving control.

By doing so, since it is possible to balance the utilization rates of the converter units, it is possible to reduce the loads placed on individual converter units, and as a result it is possible to use a small heat sink.

With the switching power supply device according to the present invention, by executing the first driving control with k1 set at zero, it is possible to cope with (i.e., to control the DC output voltage within the first voltage range) the smallest loads.

With the switching power supply device according to the present invention, by executing the fourth driving control with k4 set at n, it is possible to cope with (i.e., to control the DC output voltage within the second voltage range) the heaviest loads.

The switching power supply device according to the present invention has, wherein when executing the first driving control, the second driving control, the third driving control, and the fourth driving control, the control unit drives the converter units by burst control.

By doing so, when each converter unit is constructed as a resonant converter, since it is possible to drive the respective converter units in driving periods with a fixed time ratio and a fixed frequency that are capable of reliably satisfying the conditions for zero volt switching, it is possible to reliably improve the efficiency of each converter unit.

It should be noted that the disclosure of the present invention relates to the contents of Japanese Patent Application No. 2017-017336 that was filed on Feb. 2, 2017, the entire contents of which are herein incorporated by reference.

BRIEF DESCRIPTION OF THE DRAWINGS

These and other objects and features of the present invention will be explained in more detail below with reference to the attached drawings, wherein:

FIG. 8 is a diagram useful in explaining an operation of the switching power supply device 1 in a heavy load state;

FIG. 9 is a characteristics graph depicting the relationship between a load factor a and a frequency (burst frequency) for the switching power supply device 1 and a switching power supply device that is a comparative example;

DESCRIPTION OF THE PREFERRED EMBODIMENTS

Preferred embodiments of a switching power supply device will now be described with reference to the attached drawings.

Figure 1:
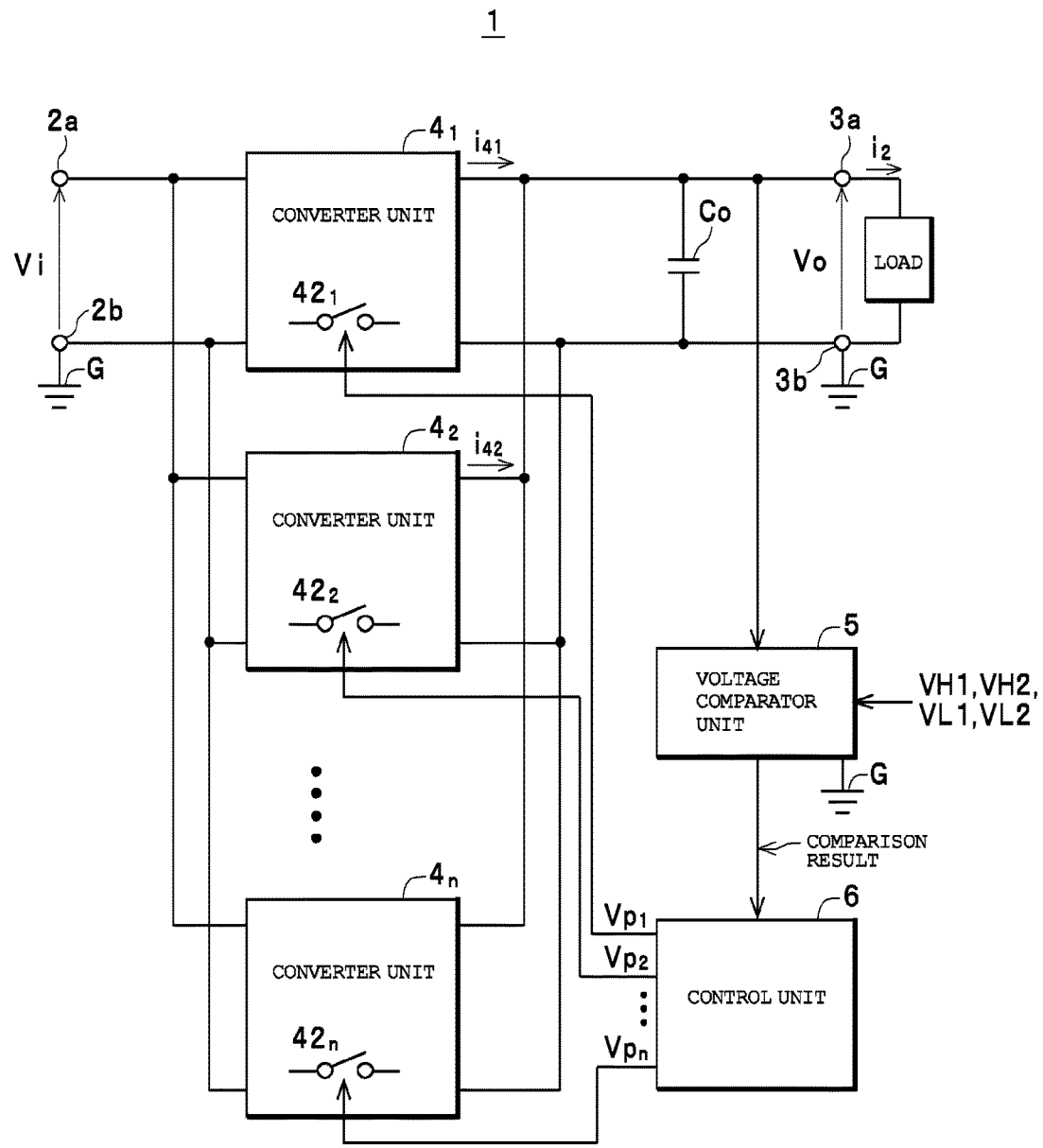
FIG. 1 is a block diagram depicting the configuration of a switching power supply device 1.

As depicted in FIG. 1, a switching power supply device 1 as one example of a "switching power supply device" is equipped with a pair of direct current (DC) input terminals 2a and 2b as a "DC input unit", a pair of DC output terminals 3a and 3b as a "DC output unit", a plurality (n, where n is an integer of two or higher) of converter units $4_1, 4_2, \ldots, 4_n$ that are connected in parallel between the pair of DC input terminals 2a and 2b and the pair of DC output terminals 3a and 3b, a voltage comparator unit 5, and a control unit 6, and is configured to be capable of generating a DC output voltage Vo based on a DC input voltage Vi inputted across the DC input terminals 2a and 2b and outputting the DC output voltage Vo from the DC output terminals 3a and 3b to a load. Note that as one example in the present embodiment, the DC input voltage Vi is inputted across the DC input terminals 2a and 2b with the DC input terminal 2b connected to a reference potential (in the present embodiment, a common ground G) as the low potential side. In addition in the present embodiment, since the DC output terminal 3b out of the DC output terminals 3a and 3b is connected to the common ground G and the switching power supply device 1 as a whole is configured as a non-isolated converter device, the DC output voltage Vo is outputted from the DC output terminals 3a and 3b with the DC output terminal 3b as the low potential side.

The converter units $4_1, 4_2, \ldots, 4_n$ (hereinafter referred to as the "converter units 4" when no particular distinction is made between them) have the same configuration (as one example, resonant converters of the same configuration). The converter unit $4_1$ will now be described as one example of the configuration of the converter units 4.

Figure 2:
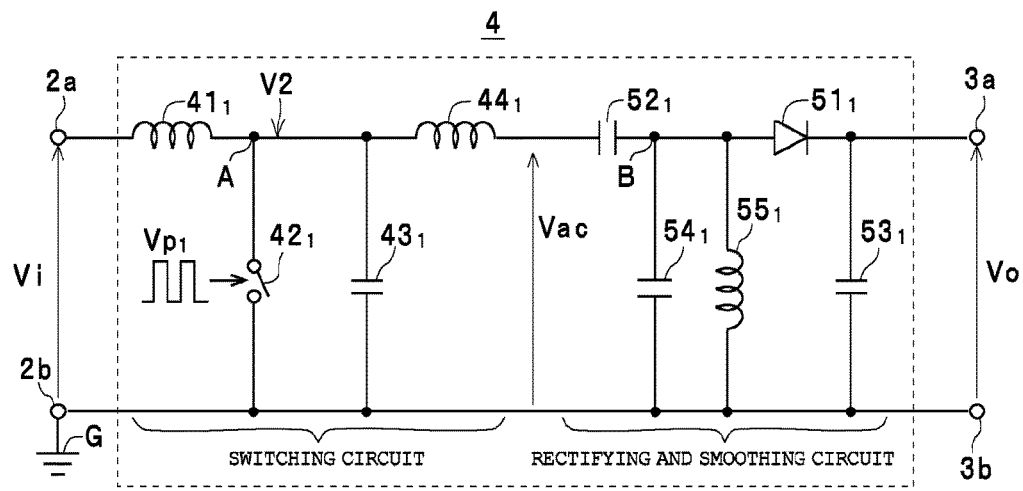
FIG. 2 is a circuit diagram depicting an example circuit of a converter unit 4.

In more detail, as depicted in FIG. 2, the converter unit $4_1$ is equipped with a switching circuit and a rectifying and smoothing circuit. As one example, the switching circuit is equipped with a series circuit composed of a first resonant inductor $41_1$ and a switching element $42_1$, a first resonant capacitor $43_1$ connected in parallel to the switching element $42_1$, and a second resonant inductor $44_1$ that is connected at one end to a junction (or "first junction A") between the resonant inductor $41_1$ and the switching element $42_1$. In the switching circuit, a series circuit composed of the first resonant inductor $41_1$ and the switching element $42_1$ is connected across the pair of DC input terminals 2a and 2b, a series circuit composed of the first resonant inductor $41_1$ and the second resonant inductor $44_1$ is connected to one DC input terminal out of the pair of DC input terminals 2a and 2b (in this example, to the DC input terminal 2a), and a terminal, out of the pair of terminals of the switching element $42_1$, that is not connected to the first junction A is connected to the other DC input terminal out of the pair of DC input terminals 2a and 2b (in this example, to the DC input terminal 2b). Note that it is assumed that the output capacitance (not illustrated) of the switching element $42_1$ is included in the first resonant capacitor $43_1$. The switching element $42_1$ is composed of a field effect transistor such as a MOSFET (Metal-Oxide-Semiconductor Field-Effect Transistor), a bipolar transistor, a GaN (gallium nitride) device, or the like.

By driving the switching element $42_1$ using a corresponding driving voltage Vp (in this example, the driving voltage $Vp_1$) out of driving voltages $Vp_1, Vp_1, Vp_2, Vp_n$ (hereinafter referred to as the "driving voltage Vp" when no particular distinction is made between them), described later, supplied from the control unit 6, the switching circuit with the above configuration that is constructed as a Class-E converter circuit is capable of converting the DC input voltage Vi inputted across the DC input terminals 2a and 2b to an AC output voltage Vac and outputting across the other terminal of the second resonant inductor $44_1$ and the DC input terminal 2b (the common ground G).

As one example, the rectifying and smoothing circuit is equipped with a series circuit composed of a second resonant capacitor $52_1$ and a third resonant capacitor $54_1$, a third resonant inductor $55_1$ connected in parallel to the third resonant capacitor $54_1$, a diode $51_1$ connected between a junction (the "second junction B") between the second resonant capacitor $52_1$ and the third resonant capacitor $54_1$ and the DC output terminals 3a and 3b (in the present example, the DC output terminal 3b), and a smoothing capacitor $53_1$ connected between the DC output terminals 3a and 3b, and is configured as a resonant rectifying and smoothing circuit. More specifically, a series circuit composed of the second resonant capacitor 52 and the third resonant capacitor 54 is connected between the other end of the second resonant inductor $44_1$ and the DC input terminal 2b (the common ground G). Also, a series circuit composed of the second resonant capacitor 52 and the diode 51 is connected between the other end of the second resonant inductor $44_1$ and the DC output terminal $3a$.

The rectifying and smoothing circuit with the configuration described above is capable of converting the AC output voltage Vac outputted from the switching circuit to the DC output voltage Vo and outputting to the DC output terminals $3a$ and $3b$. Note that the smoothing capacitors $53_1$, $53_2$, . . . , $53_n$ (note that the smoothing capacitors $53_2$, . . . , $53_n$ aside from the smoothing capacitor $53_1$ are omitted from the drawings) included in the rectifying and smoothing circuits of the converter units $4_1$, $4_2$, . . . , $4_n$ are connected to each other in parallel. For this reason, in the following description, a configuration where one output capacitor Co with a capacitance that is equal to the combined parallel capacitance of the smoothing capacitors $53_1$, $53_2$, . . . , $53_n$ is connected between the DC output terminals $3a$ and $3b$ as depicted in FIG. 1 is described.

Figure 3:
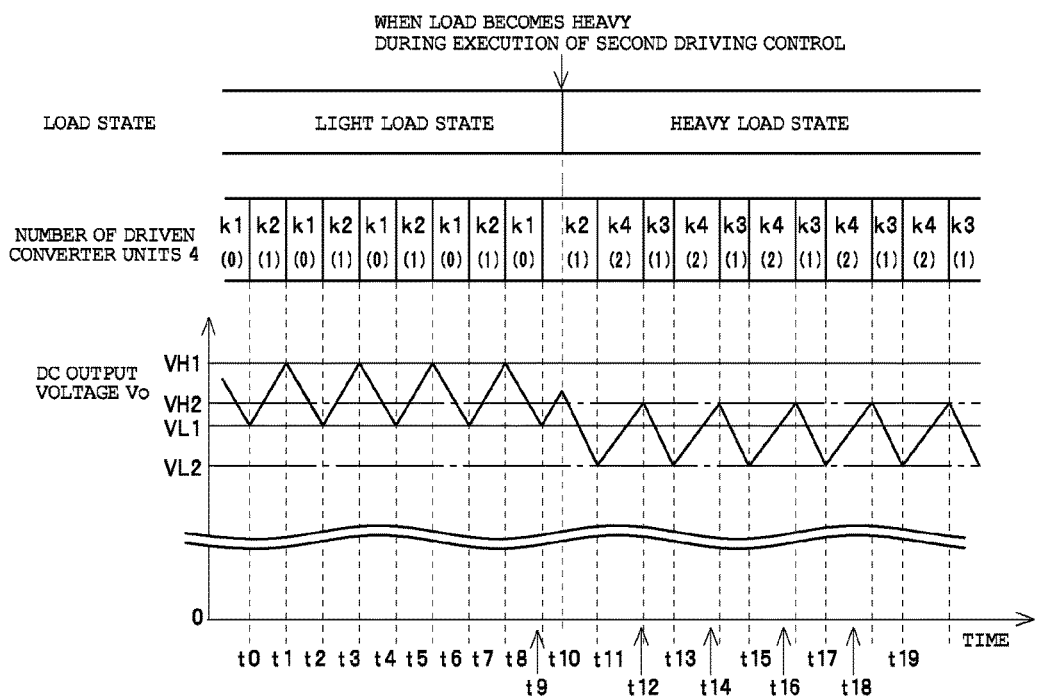
FIG. 3 is a diagram useful in explaining an operation of the switching power supply device 1.

The voltage comparator unit 5 includes a hysteresis comparator, for example, and while detecting the DC output voltage Vo, compares the DC output voltage Vo with a first voltage range that is set in advance (a voltage range defined by an upper limit value VH1 and a lower limit value VL1) and a second voltage range that is set in advance (a voltage range defined by an upper limit value VH2 and a lower limit value VL2), and outputs the comparison result to the control unit 6. As one example in the present embodiment, the second voltage range is set so that the upper limit value VH2 is lower than the upper limit value VH1 of the first voltage range and the lower limit value VL2 is lower than the lower limit value VL1 of the first voltage range. Also as one example in the present embodiment, as depicted in FIG. 3 and the like, although the upper limit value VH2 of the second voltage range is set at a value that exceeds the lower limit value VL1 of the first voltage range, the relative magnitudes of the upper limit value VH2 and the lower limit value VL1 are arbitrary. It is also possible to configure the voltage comparator unit 5 so as to be equipped with a hysteresis comparator and other circuitry (a CPU or the like) that outputs information depicting the comparison result described above based on the output of the hysteresis comparator. It is also possible to configure the voltage comparator unit 5 of a CPU, a DSP, an FPGA, or the like without using a hysteresis comparator.

The control unit 6 executes driving control over the respective n converter units $4_1$, $4_2$, . . . , $4_n$ by generating n driving voltages $Vp_1$, $Vp_2$, $Vp_n$ that one-to-one correspond with the n converter units $4_1$, $4_2$, . . . , $4_n$ and outputting the driving voltages $Vp_1$, $Vp_1$, $Vp_2$, $Vp_n$ to the switching elements $42_1$, $42_2$, . . . , $42_n$ of the converter units $4_1$, $4_2$, . . . , $4_n$. Here, the control unit 6 executes first driving control that drives only k1 converter units out of the n converter units 4 (where k1 is an integer that is equal to or above zero but less than n), second driving control that drives k2 converter units out of the n converter units 4 (where k2 is an integer that is greater than k1 but less than n), third driving control that drives k3 converter units out of the n converter units 4 (where k3 is an integer that is greater than k1 but less than n), and fourth driving control that drives k4 converter units out of the n converter units 4 (where k4 is an integer that is greater than k2 and k3 but less than n).

More specifically, as depicted in FIG. 3 for example, in a light load state, the control unit 6 executes a light load operation that repeatedly executes the second driving control and the first driving control in that order, and in a heavy load state where the load is heavier than a light load, the control unit 6 executes a heavy load operation that repeatedly executes the fourth driving control and the third driving control in that order. In more detail, as depicted in the drawings, when, in a state where the second driving control is being executed, the DC output voltage Vo has risen and reached the upper limit value VH1 of the first voltage range (i.e., a comparison result indicating that the DC output voltage Vo has risen and reached the upper limit value VH1 of the first voltage range has been acquired from the voltage comparator unit 5), the control unit 6 executes the first driving control in place of the second driving control and when, in a state where the first driving control is being executed, the DC output voltage Vo has fallen and reached the lower limit value VL1 of the first voltage range (i.e., a comparison result indicating that the DC output voltage Vo has fallen and reached the lower limit value VL1 of the first voltage range has been acquired), the control unit 6 executes the second driving control in place of the first driving control so as to control the DC output voltage Vo within the range of the first voltage range in the light load state (i.e., a state where the load connected to the DC output terminals $3a$ and $3b$ is a light load).

Also, when, in a state where the fourth driving control is being executed, the DC output voltage Vo has risen and reached the upper limit value VH2 of the second voltage range (i.e., a comparison result indicating that the DC output voltage Vo has risen and reached the upper limit value VH2 of the second voltage range has been acquired), the control unit 6 executes the third driving control in place of the fourth driving control and when, in a state where the third driving control is being executed, the DC output voltage Vo has fallen and reached the lower limit value VL2 of the second voltage range (i.e., a comparison result indicating that the DC output voltage Vo has fallen and reached the lower limit value VL2 of the second voltage range has been acquired), the control unit 6 executes the fourth driving control in place of the third driving control so as to control the DC output voltage Vo within the second voltage range in the heavy load state (i.e., a state where the load connected to the DC output terminals $3a$ and $3b$ is a heavy load).

Also, when, in a state where the second driving control is being executed, the DC output voltage Vo has fallen and reached the lower limit value VL2 of the second voltage range (i.e., a comparison result indicating that the DC output voltage Vo has fallen and reached the lower limit value VL2 of the second voltage range has been acquired), since this is due to the load changing from the light load state to the heavy load state, the control unit 6 executes the fourth driving control in place of the second driving control to transition to driving control in the heavy load state described above where the third driving control and the fourth driving control are repeated. Also, when, in a state where the third driving control is being executed, the DC output voltage Vo has risen and reached the upper limit value VH1 of the first voltage range (i.e., a comparison result indicating that the DC output voltage Vo has risen and reached the upper limit value VH1 of the first voltage range has been acquired), since this is due to the load changing from the heavy load state to the light load state, the control unit 6 executes the first driving control in place of the third driving control to transition to driving control in the light load state described above where the first driving control and the second driving control are repeated.

The control unit 6 generates the driving voltages Vp outputted to each converter unit 4 in each driving control out of the first driving control to the fourth driving control described above in a state that includes a plurality of switching pulses with a fixed time ratio and a fixed frequency that are set in advance so that the converter units 4 that have the same configuration perform a zero volt switching operation. By doing so, the respective converter units 4 are driven in bursts by the driving voltages Vp.

As one example, the control unit 6 that operates as described above includes an oscillator for generating switching pulses, n gate circuits into which the switching pulses are inputted and which are capable of enable control (gate circuits provided so as to one-to-one correspond to the n converter units 4), and a sequential circuit (a state machine that makes transitions based on the comparison result from the voltage comparator unit 5 to any out of the first state, the second state, the third state, and the fourth state described above) or a CPU that decides what driving control out of the first driving control to the fourth driving control is to be executed by the respective converter units 4 based on the comparison result from the voltage comparator unit 5, enables the gate circuits corresponding to the converter units 4 to be driven for only the driving period to output the switching pulses as the driving voltages Vp, and disables gate circuits corresponding to the converter units 4 to be stopped to stop the outputting of the driving voltages Vp.

Next, normal operation of the switching power supply device 1 in the light load state, normal operation in the heavy load state, operation when there is a change from the light load state to the heavy load state, and operation when there is a change from the heavy load state to the light load state will be described. For ease of understanding the operation, it is assumed in the following description that n is two, k1 that is the number of converter units 4 that are driven in the first driving control is zero, k2 that is the number of converter units 4 that are driven in the second driving control is one, k3 that is the number of converter units 4 that are driven in the third driving control is one, and k4 that is the number of converter units 4 that are driven in the fourth driving control is n (that is, in this example two). Accordingly, in this example, it is assumed that the control unit 6 generates and outputs two driving voltages $Vp_1$ and $Vp_2$ that one-to-one correspond to the two converter units $4_1$ and $4_2$.

First, normal operation of the switching power supply device 1 in the light load state, the operation when there is a change from the light load state to the heavy load state, and normal operation in the heavy load state will be described with reference to FIG. 3.

First, the normal operation in the light load state during a period from time t0 to time t8 will be described. Note that it is assumed that immediately before time t0, the control unit 6 was executing the first driving control (control that sets the number of converter units 4 subject to driving control at k1(=0)) for the converter units 4. Since by doing so all of the converter units 4 enter a stopped state, in the period immediately before time t0, current is supplied to the load by discharging of the output capacitor Co as depicted in FIG. 3, resulting in a fall in the DC output voltage Vo.

After this, when the DC output voltage Vo that has fallen reaches the lower limit value VL1 of the first voltage range at time t0, this is detected by the voltage comparator unit 5, which outputs a comparison result indicating that the DC output voltage Vo has fallen and reached the lower limit value VL1 of the first voltage range to the control unit 6. The control unit 6 acquires the comparison result in a state where the first driving control is being executed and executes the second driving control, which sets the number of converter units 4 to be driven at k2(=1), in place of the first driving control from time to. Here, since the current outputted from one converter unit 4 is larger than the current to be supplied to the load in the light load state, the output capacitor Co is charged by a current that is the difference between these currents, causing the DC output voltage Vo to rise.

After this, at time t1, when the DC output voltage Vo that has risen reaches the upper limit value VH1 of the first voltage range, this is detected by the voltage comparator unit 5, which outputs a comparison result indicating that the DC output voltage Vo has risen and reached the upper limit value VH1 of the first voltage range to the control unit 6. The control unit 6 acquires the comparison result in a state where the second driving control is being executed and executes the first driving control described above in place of the second driving control described above from time t1. Here, since all of the converter units 4 enter a stopped state, current is supplied to the load by discharging of the output capacitor Co, resulting in a drop in the DC output voltage Vo.

After this, at time t2, when the DC output voltage Vo that has fallen reaches the lower limit value VL1 of the first voltage range, this is detected by the voltage comparator unit 5, which outputs a comparison result indicating that the DC output voltage Vo has fallen and reached the lower limit value VL1 of the first voltage range to the control unit 6. By doing so, the control unit 6 acquires the comparison result in a state where the first driving control is being executed and executes the same driving control as the driving control from time t0 described above, so that the DC output voltage Vo rises from time t2.

In the period from time t0 to time t9 where the light load state continues, the control unit 6 executes the normal operation in the light load state where the operation from time t0 to time t2 described above is repeated (i.e., the first driving control and the second driving control are repeated for the converter units 4), so that ripples (variations) in the DC output voltage Vo are kept within the first voltage range.

Next, the operation of the switching power supply device 1 when the load changes from the light load state to the heavy load state and the heavy load state continues thereafter will now be described. As one example, as depicted in FIG. 3, it is assumed that at time t10 when the switching power supply device 1 is executing the normal operation during the light load state described above (in this example, when executing the second driving control that drives one converter unit 4), the load changes from the light load state to the heavy load state. When the load is heavy, the current outputted from one converter unit 4 is insufficient as the current to be supplied to the load in the heavy load state. Since this insufficiency is covered by discharging of the output capacitor Co, the DC output voltage Vo falls.

After this, at time t11, when the DC output voltage Vo that has fallen reaches the lower limit value VL2 of the second voltage range, this is detected by the voltage comparator unit 5, which outputs a comparison result indicating that the DC output voltage Vo has fallen and reached the lower limit value VL2 of the second voltage range to the control unit 6. The control unit 6 acquires the comparison result in a state where the second driving control is being executed and executes the fourth driving control, which sets the number of converter units 4 to be driven at k4(=2), in place of the second driving control from time t11. Here, since the current outputted from two converter units 4 is larger than the current to be supplied to the load in the heavy load state, the output capacitor Co is charged by a current that is the difference between these currents, causing the DC output voltage Vo to rise.

After this, at time t12, when the DC output voltage Vo that has risen reaches the upper limit value VH2 of the second voltage range, this is detected by the voltage comparator unit 5, which outputs a comparison result indicating that the DC output voltage Vo has risen in a state where the fourth driving control is being executed and reached the upper limit value VH2 of the second voltage range to the control unit 6. The control unit 6 acquires the comparison result in a state where the fourth driving control is being executed and executes the third driving control, which sets the number of converter units 4 to be driven at k3(=1), in place of the fourth driving control from time t12. Here, the current outputted from one converter unit 4 is insufficient as the current to be supplied to the load in the heavy load state. Since this insufficiency is covered by discharging of the output capacitor Co, the DC output voltage Vo falls.

After this, at time t13, when the DC output voltage Vo that has fallen reaches the lower limit value VL2 of the second voltage range, this is detected by the voltage comparator unit 5, which outputs a comparison result indicating that the DC output voltage Vo has fallen and reached the lower limit value VL2 of the second voltage range to the control unit 6. By doing so, since the control unit 6 acquires the comparison result in a state where the third driving control is being executed and executes the same driving control as the driving control from the time t11 described above, the DC output voltage Vo rises from time t13.

When the load has changed from the light load state to the heavy load state, in the switching power supply device 1, the control unit 6 switches from an operation that controls ripples in the DC output voltage Vo within the first voltage range to an operation that controls within the second voltage range. Also, as depicted in FIG. 3, when the heavy load state continues from time t10 onwards, the control unit 6 controls ripples in the DC output voltage Vo so as to be within the second voltage range by executing the normal operation in the heavy load state that repeats the operation from time t11 to time t13 described above (i.e., repeating the third driving control and the fourth driving control for the converter units 4).

Note that although an example where the load changes from the light load state to the heavy load state when the second driving control (i.e., driving control that drives one converter unit 4) in the normal operation in the light load state is being executed by the control unit 6 has been described above, there are also cases where the load changes from the light load state to the heavy load state when the first driving control in the normal operation in the light load state is being executed by the control unit 6 (i.e., driving control that stops all of the converter units 4).

Figure 4:
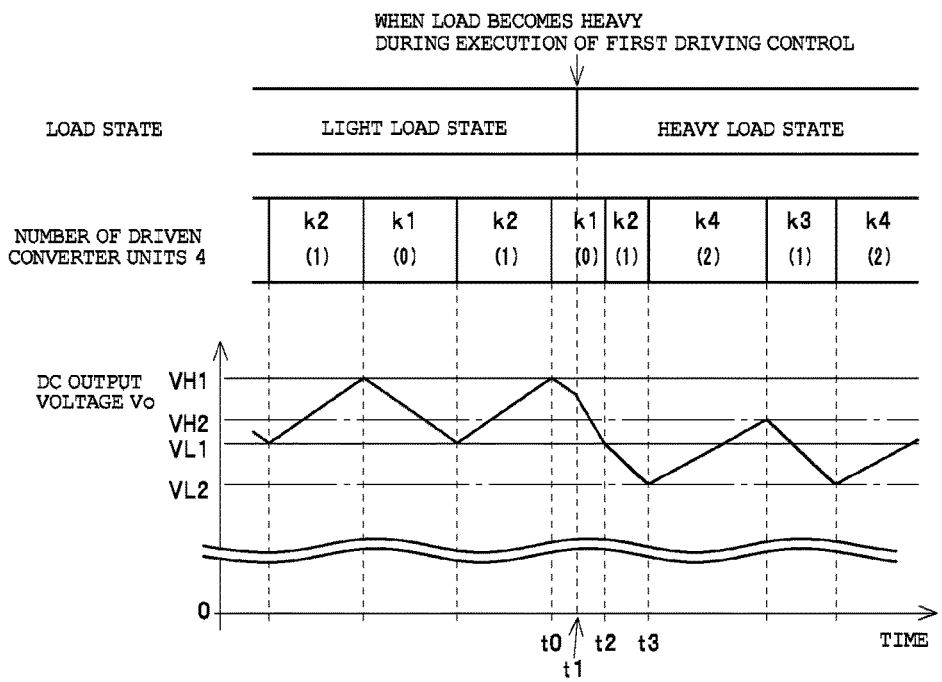
FIG. 4 is another diagram useful in explaining an operation of the switching power supply device 1.

The operation in this case will now be described with reference to FIG. 4. In FIG. 4, the control unit 6 was executing the second driving control in the normal operation in the light load state immediately before time t0 and executes the first driving control in the normal operation from the time t0. This means that ripples in the DC output voltage Vo are controlled so as to be within the first voltage range. Here, assume that at time t1 when the control unit 6 is executing the first driving control, the load changes from the light load state to the heavy load state. In this case, since the heavy load state is entered in a state where all of the converter units 4 are stopped, the DC output voltage Vo rapidly falls from time t1.

After this, at time t2, when the DC output voltage Vo that has fallen reaches the lower limit value VL1 of the first voltage range, this is detected by the voltage comparator unit 5, which outputs a comparison result indicating that the DC output voltage Vo has fallen and reached the lower limit value VL1 of the first voltage range to the control unit 6. By doing so, the control unit 6 acquires the comparison result in a state where the first driving control is executed and executes the second driving control, which sets the number of converter units 4 to be driven at k2(=1), in place of the first driving control described above from time t2. However, the current outputted from one converter unit 4 is insufficient as the current to be supplied to the load in the heavy load state. Since this insufficiency is covered by discharging of the output capacitor Co, the DC output voltage Vo falls further.

After this, at time t3, when the DC output voltage Vo that has fallen reaches the lower limit value VL2 of the second voltage range, this is detected by the voltage comparator unit 5, which outputs a comparison result indicating that the DC output voltage Vo has fallen and reached the lower limit value VL2 of the second voltage range to the control unit 6. The control unit 6 acquires the comparison result in a state where the second driving control is being executed and executes the fourth driving control, which sets the number of converter units 4 to be driven at k4(=2), in place of the second driving control from time t3. Here, since the current outputted from two converter units 4 is larger than the current to be supplied to the load in the heavy load state, the output capacitor Co is charged by a current that is the difference between these currents, causing the DC output voltage Vo to rise. From time t3 onwards, the control unit 6 executes the normal operation in the heavy load state described above. This means that the ripples of the DC output voltage Vo are controlled so as to be within the second voltage range.

Figure 5:
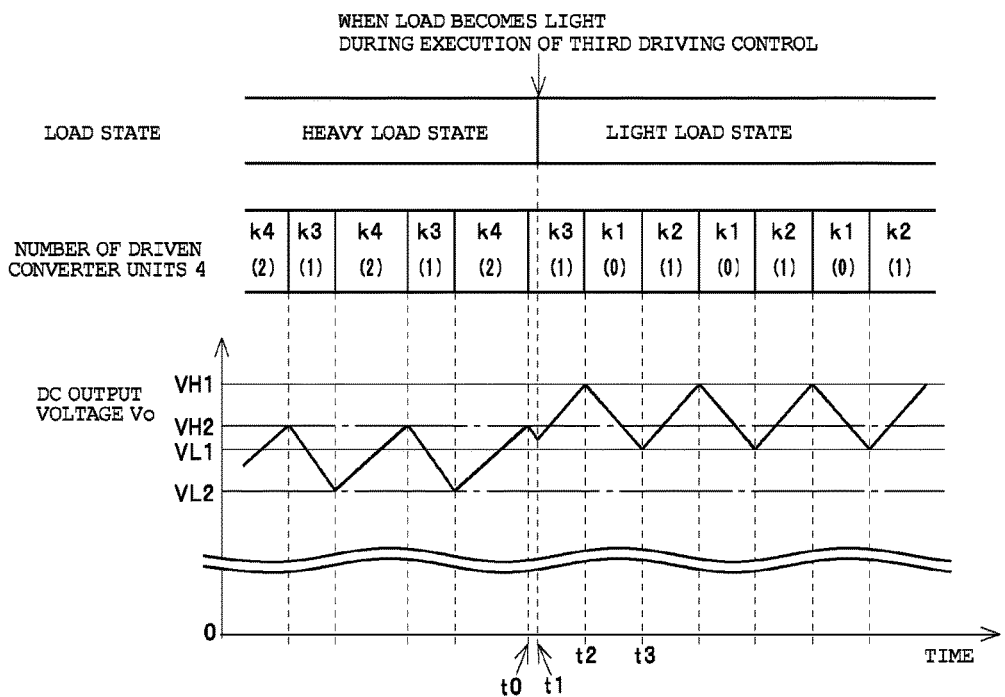
FIG. 5 is another diagram useful in explaining an operation of the switching power supply device 1.

Next, the operation of the switching power supply device 1 when the load changes from the heavy load state to the light load state will be described with reference to FIG. 5. In FIG. 5, the control unit 6 was executing the fourth driving control in the normal operation for the heavy load state immediately before time t0 and executes the third driving control in the normal operation from time t0 onwards. This means that ripples in the DC output voltage Vo are controlled so as to be within the second voltage range. It is assumed here that the load changes from the heavy load state to the light load state at the time t1 when the control unit 6 is executing the third driving control. Here, since a light load state is entered in a state where one converter unit 4 is operating, the DC output voltage Vo rises from time t1.

After this, at time t2, when the DC output voltage Vo that has risen reaches the upper limit value VH1 of the first voltage range, this is detected by the voltage comparator unit 5, which outputs a comparison result indicating that the DC output voltage Vo has risen and reached the upper limit value VH1 of the first voltage range to the control unit 6. By doing so, since the control unit 6 acquires the comparison result in a state where the third driving control is being executed and executes the first driving control, which sets the number of converter units 4 to be driven at k1(=0), in place of the third driving control from time t2. Here, since all of the converter units 4 enter a stopped state, current is supplied to the load by discharging of the output capacitor Co, resulting in a drop in the DC output voltage Vo.

After this, at time t3, when the DC output voltage Vo that has fallen reaches the lower limit VL1 of the first voltage range, this is detected by the voltage comparator unit 5, which outputs a comparison result indicating that the DC output voltage Vo has fallen and reached the lower limit value VL1 of the first voltage range to the control unit 6. By doing so, since the control unit 6 acquires the comparison result in a state where the first driving control is being executed and executes the second driving control, which sets the number of converter units 4 to be driven at k2 (=1), from the time t3. Here, since the current outputted from one converter unit 4 is larger than the current to be supplied to the load in the light load state, the output capacitor Co is charged by a current that is the difference between these currents, causing the DC output voltage Vo to rise. From time t3 onwards, the control unit 6 executes the normal operation in the light load state described above. This means that the ripples in the DC output voltage Vo are controlled so as to be within the first voltage range.

Note that although an example where the load changes from the heavy load state to the light load state when the third driving control (i.e., driving control that drives one converter unit 4) in the normal operation in the heavy load state is being executed by the control unit 6 has been described above, there are also cases where the load changes from the heavy load state to the light load state when the fourth driving control (i.e., driving control that drives two converter units 4) in the normal operation in the heavy load state is being executed by the control unit 6.

Figure 6:
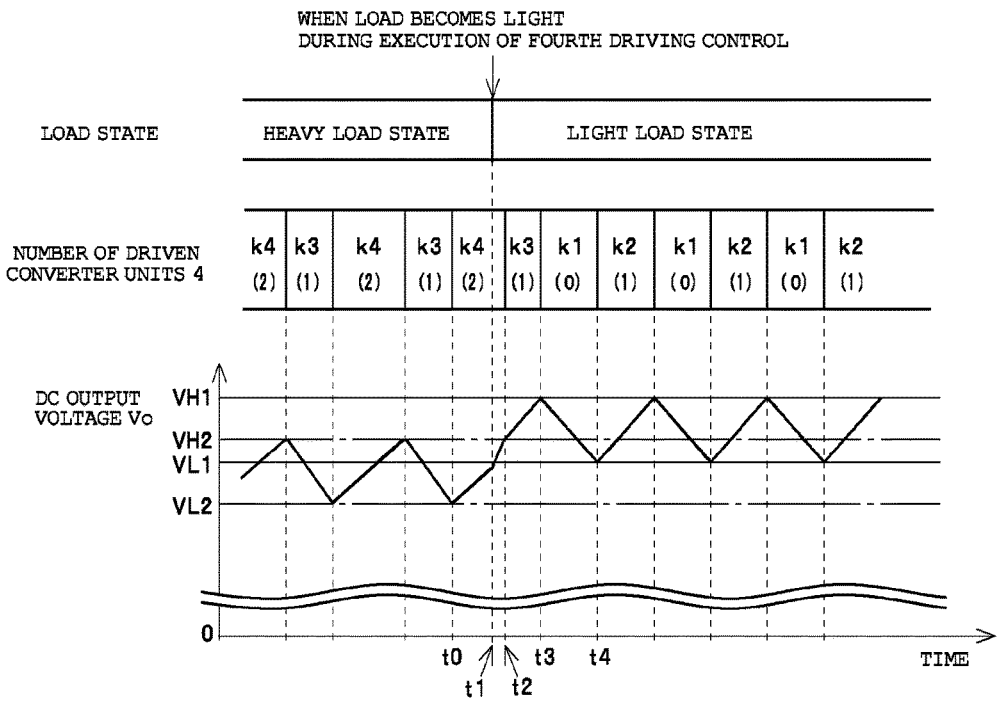
FIG. 6 is another diagram useful in explaining an operation of the switching power supply device 1.

The operation in this case will now be described with reference to FIG. 6. In FIG. 6, the control unit 6 was executing the third driving control in the normal operation for the heavy load state immediately before t0 and executes the fourth driving control in the normal mode from t0. This means that variations (ripples) in the DC output voltage Vo are controlled so as to be within the second voltage range. It is assumed that at time t1 when the fourth driving control is being executed by the control unit 6, the load changes from the heavy load state to the light load state. Here, since the light load state is entered in a state where all of the converter units 4 are operating, the DC output voltage Vo rapidly rises from time t1.

After this, when the DC output voltage Vo that has risen reaches the upper limit value VH2 of the second voltage range at time t2, this is detected by the voltage comparator unit 5, which outputs a comparison result indicating that the DC output voltage Vo has risen and reached the upper limit value VH2 of the second voltage range to the control unit 6. By doing so, the control unit 6 acquires the comparison result in a state where the fourth driving control is executed and executes the third driving control, which sets the number of converter units 4 to be driven at k3 (=1), in place of the fourth driving control from time t2. Here, since the current outputted from one converter unit 4 is larger than the current supplied to the load in the light load state, the output capacitor Co is charged by a current that is the difference between these currents, causing the DC output voltage Vo to rise.

After this, at time t3, when the DC output voltage Vo that has risen reaches the upper limit value VH1 of the first voltage range, this is detected by the voltage comparator unit 5, which outputs a comparison result indicating that the DC output voltage Vo has risen and reached the upper limit value VH1 of the first voltage range to the control unit 6. The control unit 6 acquires the comparison result in a state where the third driving control is being executed and executes the first driving control, which sets the number of converter units 4 to be driven at k1(=0), in place of the third driving control from time t3. Here, since all of the converter units 4 enter a stopped state, current is supplied to the load by discharging of the output capacitor Co, resulting in a drop in the DC output voltage Vo.

After this, when the DC output voltage Vo that has fallen reaches the lower limit value VL1 of the first voltage range at time t4, this is detected by the voltage comparator unit 5, which outputs a comparison result indicating that the DC output voltage Vo has fallen and reached the lower limit value VL1 of the first voltage range to the control unit 6. The control unit 6 acquires the comparison result in a state where the first driving control is being executed and executes the second driving control, which sets the number of converter units 4 to be driven at k2(=1), in place of the first driving control from time t4. Here, since the current outputted from one converter unit 4 is larger than the current to be supplied to the load in the light load state, the output capacitor Co is charged by a current that is the difference between these currents, causing the DC output voltage Vo to rise. From time t4 onwards, the control unit 6 executes the normal operation in the light load state described above. This means that ripples in the DC output voltage Vo are controlled so as to be within the first voltage range.

In this way, in the switching power supply device 1, in a normal operation in the light load state, the control unit 6 repeatedly executes the first driving control that sets the driven number of converter units 4 at k1 (=0) and the second driving control that sets the driven number of converter units 4 at k2 (=1) to keep the variations (ripples) in the DC output voltage Vo within the first voltage range, and in a normal operation in the heavy load state, the control unit 6 repeatedly executes the third driving control that sets the driven number of converter units 4 at k3 (=1) and the fourth driving control that sets the driven number of converter units 4 at k4 (=2) to keep the ripples in the DC output voltage Vo within the second voltage range.

Accordingly, with the switching power supply device 1, compared to a conventional switching power supply device that controls variations within the DC output voltage so as to be within a single voltage range (a voltage range defined by one upper limit value and one lower limit value) by performing driving control that simultaneously drives or simultaneously stops all of the converter units 4 in both the light load state and the heavy load state, it is possible, while keeping the output power the same in the heavy load state, to reduce the number of converter units 4 driven in the light load state, which improves efficiency.

Figure 7:
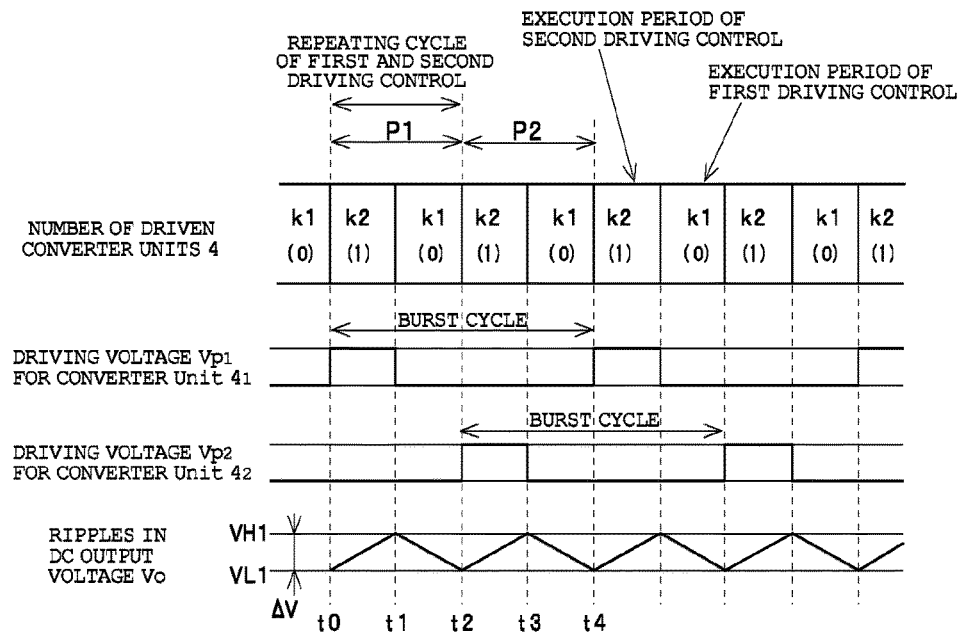
FIG. 7 is a diagram useful in explaining an operation of the switching power supply device 1 in a light load state.

Also, although it is possible for the switching power supply device 1 to use a configuration that repeatedly executes the first driving control, which sets the driven number of converter units 4 at k1, and the second driving control, which sets the driven number of converter units 4 at k2, by executing driving control (i.e., control that drives by outputting the driving voltage Vp) over only one out of the plurality of converter units 4 during normal operation in the light load state, as depicted in FIG. 7, the present embodiment uses a configuration that drives the two converter units $4_1$ and $4_2$ alternately while providing a stopped period (a period where neither of the driving voltages $Vp_1$ and $Vp_2$ is outputted) between the respective driving periods (i.e., periods in which one of the driving voltages $Vp_1$ and $Vp_2$ is outputted).

By doing so, as depicted in FIG. 7, a period where one of the converter units $4_1$ and $4_2$ is driven by one of the driving voltages $Vp_1$ and $Vp_2$ is the execution period of the second driving control and a period where neither of the driving voltages $Vp_1$ and $Vp_2$ is outputted and both of the converter units $4_1$ and $4_2$ are stopped is the execution period of the first driving control. Also, as depicted in FIG. 7, the burst cycles of the individual converter units 4 are double the repeating cycle of the first driving control and the second driving control (i.e., the cycle of ripples in the DC output voltage Vo).

Here, a configuration is used where while repeatedly executing the second driving control and the first driving control in that order, in a period (for example, the period P2) where the second driving control and the first driving control are to be newly executed, the control unit 6 drives a converter unit 4 (in this example, since the converter unit 4$_1$ is driven in the period P1, the converter unit 4$_2$) that was not driven in the immediately preceding period (for example, the period P1) of the second driving control and the first driving control. This means that with the switching power supply device 1, in the normal operation in the light load state, the utilization rates of the converters 4$_1$ and 4$_2$ are balanced.

In the switching power supply device 1 that is equipped with the two converters 4$_1$ and 4$_2$, during a normal operation in the heavy load state (an operation that repeats the third driving control that sets the driven number of converter units 4 at k3 and the fourth driving control that sets the driven number of converter units 4 at k4), as depicted in FIG. 8, the control unit 6 executes an operation that outputs the driving voltages Vp$_1$ and Vp$_2$ to the converters 4$_1$ and 4$_2$ for a period where the fourth driving control, the third driving control, and the fourth driving control are to be consecutively executed in that order with a cycle that is double the repeating cycle of the third driving control and the fourth driving control and shifts the phase of this repeating cycle by one cycle at a time.

By doing so, as depicted in FIG. 8, in the period where the driving voltages Vp$_1$ and Vp$_2$ are both being outputted, the fourth driving control is executed (i.e., both of the two converter units 4$_1$ and 4$_2$ are driven) and in a period where only one out of the two driving voltages Vp$_1$ and Vp$_2$ is being outputted, the third driving control is executed (i.e., only one out of the two converter units 4$_1$ and 4$_2$ is driven). Here, the burst cycles of the individual converter units 4 are double the repeating cycle of the third driving control and the fourth driving control (i.e., the cycle of the ripples in the DC output voltage Vo).

Here, a configuration is used where while repeatedly executing the fourth driving control and the third driving control in that order, in a period (for example, the period P2) where the fourth driving control and the third driving control are to be newly executed, the control unit 6 drives a converter unit 4 (in this example, since the converter unit 4$_1$ is driven in the period P1, the converter unit 4$_2$) that was not driven in the immediately preceding period (for example, the period P1) where the second driving control and the first driving control were executed. This means that with the switching power supply device 1, in the normal operation in the heavy load state also, the utilization rates of the converters 4$_1$ and 4$_2$ are balanced. Note that in the normal operation in the heavy load state, during the execution period of the fourth driving control in the new period P2, by continuously driving the converter unit 4 that started in the immediately preceding execution (in this example, the converter unit 4$_1$), the number of driven converter units 4 in the execution period of the fourth driving control is set at k4 (=2).

Accordingly, with the switching power supply device 1, as depicted in FIGS. 7 and 8, by having the control unit 6 execute driving control over the converter units 4$_1$ and 4$_2$, compared to a conventional switching power supply device (a switching power supply device that performs control so that the variations in the DC output voltage are kept within a single voltage range by performing driving control that drives all of the converter units 4 at the same time and stops all of the converter units 4 at the same time in both the light load state and the heavy load state), it is possible to extend the repeating cycle of the driving period and stopping period of the individual converter units 4 when making the ripples in the DC output voltage Vo have the same voltage width (i.e., it is possible to lower the repeating frequency), which makes it possible to further raise the efficiency.

Also, according to the switching power supply device 1, since the utilization rates of the converter units 4$_1$ and 4$_2$ are balanced, it is possible to reduce the loads placed on individual converter units 4, which makes it possible to use small heat sinks.

Figure 12:
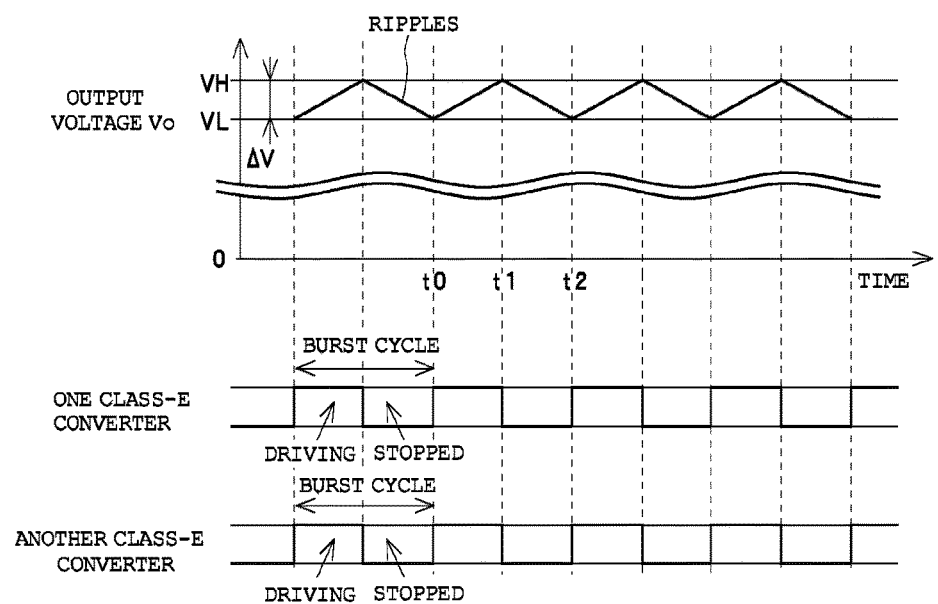
FIG. 12 is a diagram useful in explaining an operation of a switching power supply device as a comparative example.

Next, the relationship between the burst cycle in the normal operation of the switching power supply device 1 in the light load state depicted in FIG. 7 and in the heavy load state depicted in FIG. 8 and the burst frequency of the conventional switching power supply device described with reference to FIG. 12 will be described. Note that the conventional switching power supply device as a comparative example is configured with a plurality of Class-E converter circuits (here, two converter units 4$_1$ and 4$_2$, which is the same as the embodiment of the switching power supply device 1 described above where n=2), which are configured to repeat a driving period and a stopping period based on a comparison of the output voltage (DC output voltage) Vo with a high-level reference voltage VH and a low-level reference voltage VL, simply connected in parallel.

In this case, as a precondition, assume that the capacitance of the output capacitor Co is C, the width of the first voltage range (i.e., the difference between the upper limit value VH1 and the lower limit value VL1), the width of the second voltage range (i.e., the difference between the upper limit value VH2 and the lower limit value VL2), and the difference between the high-level reference voltage VH and the low-level reference voltage VL are all ΔV. It is also assumed that the currents outputted from the converter units 4$_1$ and 4$_2$ during driving are respectively i$_{41}$ and i$_{42}$ and that the maximum load current i$_{MAX}$ is i$_{MAX}$=i$_{41}$+i$_{42}$. It is assumed that i$_{41}$=i$_{42}$. When it is assumed that the load factor is a, the load current i$_2$=a×i$_{MAX}$.

First, in the waveform diagram in FIG. 7 where the switching power supply device 1 according to the present embodiment composed of the two converter units 4$_1$ and 4$_2$ is operated in the light load state, by calculating the lengths of the periods in the driving state and the stopping state and summing the lengths, the repeating cycle of the driving periods and stopping periods of the converter units 4$_1$ and 4$_2$ is calculated to calculate the repeating frequency f$_1$ (the reciprocal of the repeating cycle). When calculated from the current when charging and discharging the output capacitor Co and changes in voltage, the respective lengths of the period from time t0 to t1, the period from time t1 to t2, the period from time t2 to t3, and the period from time t3 to t4 are expressed as indicated in Expressions (1), (2), (3), and (4) below.

[Expression 1]
[Expression 2]
[Expression 3]
[Expression 4]

Next, Expressions (1) to (4) above are summed to calculate the length of the period from time t0 to t4 and then rearranged to give Expression (5) below.

[Expression 5]

The repeating frequency f$_1$, which is the reciprocal of the length of the period from time t0 to t4, is indicated in Expression (6) below. Note that the range of the load factor a for which Expression (6) holds is indicated in Expression (7) below.

[Expression 6]
[Expression 7]

In the waveform diagram in FIG. 8 where the switching power supply device 1 according to the present embodiment composed of the two converter units $4_1$ and $4_2$ is operated in the heavy load state, by calculating the lengths of the periods in the driving state and the stopping state and summing the lengths, the repeating cycle of the driving periods and stopping periods of the converter units $4_1$ and $4_2$ is calculated to calculate the repeating frequency $f_1$ (the reciprocal of the repeating cycle). When calculated from the current when charging and discharging the output capacitor Co and changes in voltage, the respective lengths of the period from time t0 to t1, the period from time t1 to t2, the period from time t2 to t3, and the period from time t3 to t4 are expressed as indicated in Expressions (8), (9), (10), and (11) below.
[Expression 8]
[Expression 9]
[Expression 10]
[Expression 11]

Next, Expressions (8) to (11) above are summed to calculate the length of the period from time t0 to t4 and then rearranged to give Expression (12) below.
[Expression 12]

The repeating frequency f2, which is the reciprocal of the length of the period time from t0 to t4, is indicated in Expression (13) below. Note that the range of the load factor a for which Expression (13) holds is indicated in Expression (14) below.
[Expression 13]
[Expression 14]

Also, by calculating the lengths of the periods in the driving state and the stopping state of the converter units $4_1$ and $4_2$ in the switching power supply device that is the comparative example where the two converter units $4_1$ and $4_2$ connected in parallel are operated as described above with reference to FIG. 12, and summing the lengths, the repeating cycle of the driving periods and stopping periods of the converter units $4_1$ and $4_2$ in this case is calculated to calculate the repeating frequency $f_0$ (the reciprocal of the repeating cycle). When calculated from the current when charging and discharging the output capacitor Co and changes in voltage, the respective lengths of the period from time t0 to t1 and the period from time t1 to t2 are expressed as indicated in Expressions (15) and (16) below.
[Expression 15]
[Expression 16]

Next, Expressions (15) and (16) above are summed to calculate the length of the period from time t0 to t2 and then rearranged to give Expression (17) below.
[Expression 17]

The repeating frequency $f_0$ that is the reciprocal of the length of the period time t0 to t2 is indicated in Expression (18) below. Note that the range of the load factor a for which Expression (13) holds is 0≤a≤1.
[Expression 18]

A graph that compares the repeating frequencies $f_1$ and $f_2$ of the driving periods and the stopping periods of the individual converter units 4 of the switching power supply device 1 according to the present embodiment with the repeating frequency f0 of the driving periods and the stopping periods of the converter units 4 of the switching power supply device that is the comparative example is depicted in FIG. 9. In FIG. 9, the horizontal axis is the load factor a and the vertical axis is the repeating frequency that has been standardized. The result of multiplying the values on the vertical axis by $i_{MAX}/(4C\Delta V)$ gives the actual frequencies.

As depicted in FIG. 9, with the switching power supply device 1 according to the present embodiment, under conditions where the maximum load current $i_{MAX}$, the capacitance C of the output capacitor Co, and the voltage range of the ripples in the DC output voltage Vo (i.e., the difference between the upper limit value and the lower limit value) $\Delta V$ are the same, it is possible to greatly lower the repeating frequency of the driving periods and the stopping periods of the respective converter units 4 compared to the switching power supply device of the comparative example across substantially the entire range of the load factor a (i.e., almost the entire range aside from when a=0 and its vicinity and when a=1 and its vicinity). With this type of converter unit 4 (i.e., resonant converter circuits such as Class-E type converters), it takes several switching cycles for a resonance operation to stabilize following startup, and losses until the resonance operation stabilizes are large compared to losses during stable operation. This means that when the repeating frequency of the driving periods and stopping periods of the converter units 4 is high, losses increase due to the converter units 4 frequently starting and stopping. With the switching power supply device 1 according to the present embodiment however, since the repeating frequency of the driving periods and stopping periods (that is, the burst frequency) can be lowered as described above, it is possible to improve the efficiency of the device.

Note that although the switching power supply device 1 is configured so as to handle the lightest loads (i.e., control of the DC output voltage Vo in the first voltage range) by setting the number k1 of converter units 4 driven in the first driving control at zero, and to handle the heaviest loads (i.e., control of the DC output voltage Vo in the second voltage range) by setting the number k4 of converter units 4 driven in the fourth driving control at n (i.e., the highest number), depending on the magnitude of the light load, it is also possible to set the number k1 of converter units 4 driven in the first driving control at a non-zero number, and depending on the magnitude of the heavy load, it is also possible to set the number k4 of converter units 4 driven in the fourth driving control at a number below n.

As one example, a case where four converter units $4_1$, $4_2$, $4_3$, and $4_4$ are provided with n as 4 and the number k1 of converter units 4 driven in the first driving control is one not zero will now be described. Note that it is assumed that the number k2 of converter units 4 driven in the second driving control is two, the number k3 of converter units 4 driven in the third driving control is two, and the number k3 of converter units 4 driven in the fourth driving control is n (that is, 4).

Figure 10:
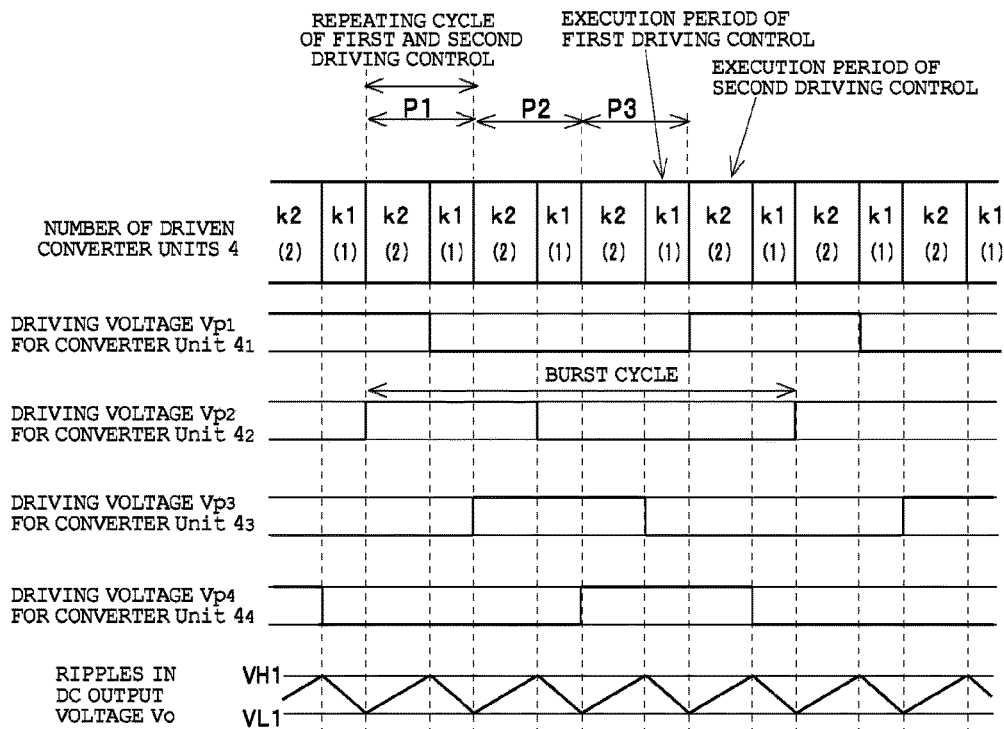
FIG. 10 is a diagram useful in explaining an operation of another switching power supply device 1 in a light load state.

In the switching power supply device 1 of this configuration, by generating the driving voltages Vp1, Vp2, Vp3, and Vp4 and outputting to the converter units $4_1$, $4_2$, $4_3$, and $4_4$ with the timing depicted in FIG. 10 during a normal operation in the light load state, the control unit 6 repeats the first driving control that drives one converter unit 4 and the second driving control that drives two converter units 4.

More specifically, as depicted in FIG. 10, the control unit 6 executes an operation that outputs the driving voltages $Vp_1$, $Vp_2$, $Vp_3$, and $Vp_4$ to the converter units $4_1$, $4_2$, $4_3$, and $4_4$ respectively during a period where the second driving control, the first driving control, and the second driving control are consecutively executed in that order for the converter units 4 in a cycle that is four times the repeating cycle of the second driving control and the first driving control while shifting the phase by one iteration of the repeating cycle.

By doing so, as depicted in FIG. 10, the second driving control is executed for the converter units 4 in a period where only two out of the driving voltages $Vp_1$, $Vp_2$, $Vp_3$, and $Vp_4$ are outputted (i.e., where only two of the converter units 4 are driven) and the first driving control is executed for the converter units 4 in a period where only one out of the driving voltages $Vp_1$, $Vp_1$, $Vp_2$, $Vp_3$, and $Vp_4$ is outputted (i.e., where only one of the converter units 4 is driven). Accordingly, as depicted in FIG. 10, the burst cycle of the individual converter units 4 is four times the repeating cycle of the first driving control and the second driving control (that is, the cycle of the ripples in the DC output voltage Vo).

In this case, a configuration is used where while repeatedly executing the second driving control and the first driving control in that order, the control unit 6 drives, in a period (for example, the period P2) where the second driving control and the first driving control are to be newly executed, a converter unit 4 (in this example, since the converter units $4_1$ and $4_2$ are driven in the period P1, either of the converter units $4_3$ and $4_4$, as one example, the converter unit $4_3$) that was not driven in a period (for example, the period P1) of the immediately preceding execution of the second driving control and the first driving control. In the same way, a configuration is used where in a period (the period P3) where the second driving control and the first driving control are to be newly executed, the control unit 6 drives a converter unit 4 (in this example, since the converter units $4_2$ and $4_3$ were driven in the period P2, one of the converter units $4_1$ and $4_4$, as one example the converter unit $4_4$) that was not driven in a period (the period P2) of the immediately preceding execution of the second driving control and the first driving control. This means that with the switching power supply device 1, in a normal operation in the light load state, the utilization rates of the converter units $4_1$, $4_2$, $4_3$, and $4_4$ are balanced. Note that in the normal operation in the light load state, during the first execution period of the second driving control in a new period, by continuing the driving of the converter unit 4 that was started in the immediately preceding execution, the driven number of converter units 4 in the execution period of the second driving control is set at k2 (=2).

Figure 11:
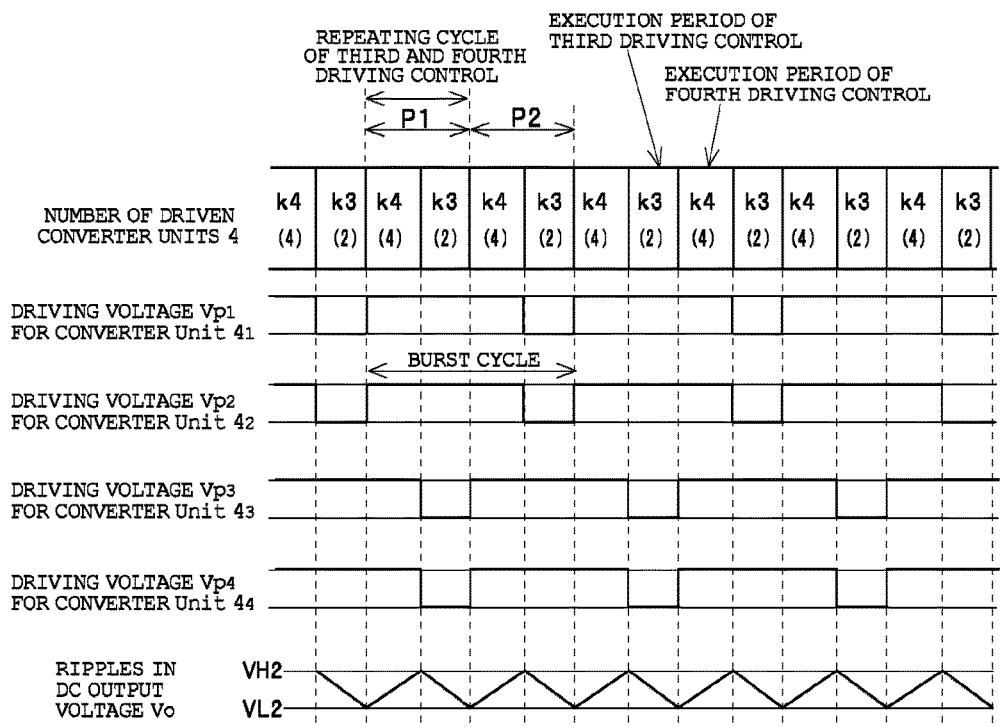
FIG. 11 is a diagram useful in explaining an operation of the other switching power supply device 1 in a heavy load state.

Also, with the switching power supply device 1 of this configuration, by generating the driving voltages $Vp_1$, $Vp_2$, $Vp_3$, and $Vp_4$ and outputting to the corresponding converter units $4_1$, $4_2$, $4_3$, and $4_4$ with the timing depicted in FIG. 11 during a normal operation in the heavy load state, the control unit 6 repeats the third driving control that drives two converter units 4 and the fourth driving control that drives four converter units 4.

More specifically, as depicted in FIG. 11, the control unit 6 executes, in a cycle that is double the repeating cycle for the third driving control and the fourth driving control, an operation that generates and respectively outputs the driving voltages $Vp_1$ and $Vp_2$ to the converter units $4_1$ and $4_2$ at the same timing during each period where the fourth driving control, the third driving control, and the fourth driving control are to be consecutively executed in that order for the converter units 4. In the same way, the control unit 6 executes, in a cycle that is double the repeating cycle for the third driving control and the fourth driving control and with a phase that is shifted by one iteration of the repeating cycle relative to the driving voltages $Vp_1$ and $Vp_2$, an operation that generates and respectively outputs the driving voltages Vp3 and Vp4 to the converter units 43 and 44 at the same timing during each period where the fourth driving control, the third driving control, and the fourth driving control are to be consecutively executed in that order for the converter units 4.

By doing so, as depicted in FIG. 11, the third driving control is executed in a period where only the driving voltages $Vp_1$ and $Vp_2$ are being outputted and the period where only the driving voltages $Vp_3$ and $Vp_4$ are being outputted (i.e., when two converter units 4 are being driven), and the fourth driving control is executed in a period where the driving voltages $Vp_1$, $Vp_2$, $Vp_3$, and $Vp_4$ are all being outputted (i.e., when four converter units 4 are being driven). Accordingly, as depicted in the drawings, the burst cycles of the individual converter units 4 are double the repeating cycle of the third driving control and the fourth driving control (that is, the cycle of the ripples in the DC output voltage Vo).

Here, a configuration is used where while repeatedly executing the fourth driving control and the third driving control in that order, in a period (for example, the period P2) where the fourth driving control and the third driving control are to be newly executed, the control unit 6 drives converter units 4 (in this example, since the converter units $4_1$ and $4_2$ are driven in the period P1, the converter units $4_3$ and $4_4$) that were not driven in the immediately preceding period (for example, the period P1) where the fourth driving control and the third driving control were executed. This means that with the switching power supply device 1, in the normal operation in the heavy load state, the utilization rates of the converter units $4_1$, $4_2$, $4_3$, and $4_4$ are balanced. Note that in the normal operation in the heavy load state, in a first execution period of the fourth driving control in a new period, by continuously driving the converter units 4 that started in the immediately preceding execution, the number of driven converter units 4 in the execution period of the fourth driving control is set at k4 (=4).

Accordingly, with the switching power supply device 1 that is configured so that the number k1 of converter units 4 driven in the first driving control is not zero (i.e., the device that executes the operation depicted in FIGS. 10 and 11), compared to the conventional switching power supply device (i.e., a switching power supply device that performs control so that the variations in the DC output voltage are kept within a single voltage range by performing driving control that drives all of the converter units 4 at the same time and stops all of the converter units 4 at the same time in both the light load state and the heavy load state), it is possible to extend the repeating cycle of the driving period and the stopping period of the individual converter units 4 when making the ripples in the DC output voltage Vo have the same voltage width (i.e., it is possible to lower the repeating frequency), which makes it possible to raise the efficiency. Also, since it is possible to balance the utilization rates of the converter units $4_1$, $4_2$, $4_3$, and $4_4$, it is possible to reduce the loads placed on individual converter units 4, which makes it possible to use small heat sinks.

Also, although the present embodiment described above uses a configuration where the control unit 6 generates and outputs the driving voltages Vp (i.e., voltage signals including a plurality of switching pulses with a fixed time ratio and fixed frequency that are set in advance) for burst driving of the converter units 4 so as to reliably satisfy zero volt switching conditions for the respective converter units 4 that are constructed as resonant converters, when the converter units 4 are not resonant converters, it is also possible to use a configuration that generates and outputs single switching pulses that drive the respective converter units 4 in continuous on states as the driving voltages Vp. Also, although the converter units 4 are constructed as resonant converters in the embodiments described above, the converter units 4 are not limited to this and may be non-resonant converters.

Expression 1

$$t_1 - t_0 = \frac{C\Delta V}{i_{41} - i_2} \tag{1}$$

Expression 2

$$t_2 - t_1 = \frac{C\Delta V}{i_2} \tag{2}$$

Expression 3

$$t_3 - t_2 = \frac{C\Delta V}{i_{42} - i_2} \tag{3}$$

Expression 4

$$t_4 - t_3 = \frac{C\Delta V}{i_2} \tag{4}$$

Expression 5

$$t_4 - t_0 = C\Delta V\left(\frac{1}{i_{41} - i_2} + \frac{1}{i_{42} - i_2} + \frac{2}{i_2}\right) = \frac{1}{a(0.5 - a)}\frac{C\Delta V}{i_{MAX}} \tag{5}$$

Expression 6

$$f_1 = a(0.5 - a)\frac{i_{MAX}}{C\Delta V} \tag{6}$$

Expression 7

$$0 \leq a \leq 0.5 \tag{7}$$

Expression 8

$$t_1 - t_0 = \frac{C\Delta V}{i_{41} + i_{42} - i_2} \tag{8}$$

Expression 9

$$t_2 - t_1 = \frac{C\Delta V}{i_2 - i_{41}} \tag{9}$$

Expression 10

$$t_3 - t_2 = \frac{C\Delta V}{i_{41} + i_{42} - i_2} \tag{10}$$

Expression 11

$$t_4 - t_3 = \frac{C\Delta V}{i_2 - i_{42}} \tag{11}$$

Expression 12

$$t_4 - t_0 = C\Delta V\left(\frac{2}{i_{41} + i_{42} - i_2} + \frac{1}{i_2 - i_{41}} + \frac{1}{i_2 - i_{42}}\right) \\ = \frac{1}{(1-a)(a-0.5)}\frac{C\Delta V}{i_{MAX}} \tag{12}$$

Expression 13

$$f_2 = (a - 0.5)(1 - a)\frac{i_{MAX}}{C\Delta V} \tag{13}$$

Expression 14

$$0.5 < a \leq 1 \tag{14}$$

Expression 15

$$t_1 - t_0 = \frac{C\Delta V}{i_{41} + i_{42} - i_2} \tag{15}$$

Expression 16

$$t_2 - t_1 = \frac{C\Delta V}{i_2} \tag{16}$$

Expression 17

$$t_2 - t_0 = C\Delta V\left(\frac{1}{i_{41} + i_{42} - i_2} + \frac{1}{i_2}\right) = \frac{1}{a(1-a)}\frac{C\Delta V}{i_{MAX}} \tag{17}$$

Expression 18

$$f_0 = a(1 - a)\frac{i_{MAX}}{C\Delta V} \tag{18}$$

What is claimed is:

1. A switching power supply device comprising:
   n (where n is an integer of two or higher) converter units that are connected in parallel between a direct current (DC) input unit and a DC output unit; and
   a control unit that executes driving control over the n converter units,
   wherein the switching power supply device generates a DC output voltage based on a DC input voltage inputted from the DC input unit and outputs the DC output voltage from the DC output unit to a load,
   the switching power supply device further comprises a voltage comparator unit that compares the DC output voltage with voltage ranges of a first voltage range set in advance and a second voltage range, which is set in advance, has an upper limit value lower than an upper limit value of the first voltage range and has a lower limit value lower than a lower limit value of the first voltage range, and outputs a comparison result to the control unit,
   the control unit is configured to be capable of executing first driving control that drives k1 (where k1 is an integer set so that 0≤k1<n) converter units out of the n converter units, second driving control that drives k2 (where k2 is an integer set so that k1<k2<n) converter units out of the n converter units, third driving control that drives k3 (where k3 is an integer set so that k1<k3<n) converter units out of the n converter units, and fourth driving control that drives k4 (where k4 is an integer set so as to exceed k2 and k3 but be equal to or below n) converter units out of the n converter units,
   the control unit executes the first driving control when, in an execution state of the second driving control, the comparison result has been obtained indicating that the DC output voltage has risen and reached the upper limit value of the first voltage range,
   the control unit executes the second driving control when, in an execution state of the first driving control, the comparison result has been obtained indicating that the DC output voltage has fallen and reached the lower limit value of the first voltage range,
   the control unit executes the third driving control when, in an execution state of the fourth driving control, the comparison result has been obtained indicating that the DC output voltage has risen and reached the upper limit value of the second voltage range, the control unit executes the fourth driving control when, in an execution state of the third driving control, the comparison result has been obtained indicating that the DC output voltage has fallen and reached the lower limit value of the second voltage range, the control unit executes the fourth driving control when, in an execution state of the second driving control, the comparison result has been obtained indicating that the DC output voltage has fallen and reached the lower limit value of the second voltage range, and the control unit executes the first driving control when, in an execution state of the third driving control, the comparison result has been obtained indicating that the DC output voltage has risen and reached the upper limit value of the first voltage range.

2. The switching power supply device according to claim 1, wherein while executing a light load operation that repeatedly executes the second driving control and the first driving control in that order when the load is a light load, the control unit drives, during a new execution of the second driving control and the first driving control, a converter unit that was not driven in an immediately preceding execution of the second driving control and the first driving control, and while executing a heavy load operation that repeatedly executes the fourth driving control and the third driving control in that order when the load is a heavy load that is heavier than the light load, the control unit drives, during a new execution of the fourth driving control and the third driving control, a converter unit that was not driven in an immediately preceding execution of the fourth driving control and the third driving control.

3. The switching power supply device according to claim 1,
wherein the control unit executes the first driving control with k1 set at zero.

4. The switching power supply device according to claim 2,
wherein the control unit executes the first driving control with k1 set at zero.

5. The switching power supply device according to claim 1,
wherein the control unit executes the fourth driving control with k4 set at n.

6. The switching power supply device according to claim 2,
wherein the control unit executes the fourth driving control with k4 set at n.

7. The switching power supply device according to claim 3,
wherein the control unit executes the fourth driving control with k4 set at n.

8. The switching power supply device according to claim 4,
wherein the control unit executes the fourth driving control with k4 set at n.

9. The switching power supply device according to claim 1,
wherein when executing the first driving control, the second driving control, the third driving control, and the fourth driving control, the control unit drives the converter units by burst control.

10. The switching power supply device according to claim 2,
wherein when executing the first driving control, the second driving control, the third driving control, and the fourth driving control, the control unit drives the converter units by burst control.

11. The switching power supply device according to claim 3,
wherein when executing the first driving control, the second driving control, the third driving control, and the fourth driving control, the control unit drives the converter units by burst control.

12. The switching power supply device according to claim 4,
wherein when executing the first driving control, the second driving control, the third driving control, and the fourth driving control, the control unit drives the converter units by burst control.

13. The switching power supply device according to claim 5,
wherein when executing the first driving control, the second driving control, the third driving control, and the fourth driving control, the control unit drives the converter units by burst control.

14. The switching power supply device according to claim 6,
wherein when executing the first driving control, the second driving control, the third driving control, and the fourth driving control, the control unit drives the converter units by burst control.

15. The switching power supply device according to claim 7,
wherein when executing the first driving control, the second driving control, the third driving control, and the fourth driving control, the control unit drives the converter units by burst control.

16. The switching power supply device according to claim 8,
wherein when executing the first driving control, the second driving control, the third driving control, and the fourth driving control, the control unit drives the converter units by burst control.

* * * * *